United States Patent
Weber

(10) Patent No.: US 8,636,137 B2
(45) Date of Patent: Jan. 28, 2014

(54) ALIGNMENT OF FOOD PRODUCTS

(75) Inventor: Guenther Weber, Gross Nemerow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 453 days.

(21) Appl. No.: 12/670,842

(22) PCT Filed: May 28, 2008

(86) PCT No.: PCT/EP2008/004255
§ 371 (c)(1),
(2), (4) Date: Jun. 24, 2010

(87) PCT Pub. No.: WO2009/015714
PCT Pub. Date: Feb. 5, 2009

(65) Prior Publication Data
US 2010/0256810 A1 Oct. 7, 2010

(30) Foreign Application Priority Data
Aug. 1, 2007 (DE) .......................... 10 2007 036 020

(51) Int. Cl.
*B65G 47/244* (2006.01)
*B65G 47/22* (2006.01)

(52) U.S. Cl.
USPC ........ 198/597; 198/456; 198/572; 198/502.2; 198/502.3

(58) Field of Classification Search
USPC ............ 198/456, 502.2, 502.3, 571, 572, 597
See application file for complete search history.

(56) References Cited

U.S. PATENT DOCUMENTS

| | | | |
|---|---|---|---|
| 2,334,384 A * | 11/1943 | Cohen ......................... | 198/369.5 |
| 3,915,282 A | 10/1975 | Remensperger | |
| 4,244,461 A * | 1/1981 | Fischer et al. ................ | 198/456 |
| 4,349,097 A * | 9/1982 | Curti .......................... | 198/369.5 |
| 5,070,998 A * | 12/1991 | Nielsen ........................ | 198/587 |
| 5,144,787 A * | 9/1992 | Whitby et al. .................... | 53/66 |
| 5,238,099 A * | 8/1993 | Schroeder et al. ............ | 198/456 |
| 5,407,190 A * | 4/1995 | Hehn ............................ | 271/225 |
| 5,927,469 A * | 7/1999 | Dunifon et al. ............... | 198/456 |
| 6,170,236 B1 * | 1/2001 | Whitby et al. .................. | 53/441 |
| 6,520,314 B1 | 2/2003 | Seiling | |
| 6,851,250 B2 | 2/2005 | Whitby et al. | |
| 7,097,029 B2 * | 8/2006 | Halang ......................... | 198/779 |
| 7,513,087 B2 * | 4/2009 | Kawanishi et al. ............... | 53/51 |
| 7,896,151 B2 * | 3/2011 | Meisinger .................. | 198/419.2 |
| 2006/0151296 A1 | 7/2006 | Halang | |

FOREIGN PATENT DOCUMENTS

| | | |
|---|---|---|
| DE | 40 37 593 C1 | 1/1992 |
| JP | 2000-229726 | 8/2000 |
| JP | 2005-162422 | 6/2005 |

* cited by examiner

*Primary Examiner* — Douglas Hess
(74) *Attorney, Agent, or Firm* — Kilpatrick Townsend and Stockton LLP

(57) ABSTRACT

The invention relates to a method for the alignment of food products in which food products arriving on an input conveyor in the supply direction arrive at an alignment station at which the products are aligned and from which the aligned products arrive at an output conveyor, wherein a misalignment of the products relative to a target alignment is detected and the product is aligned as a function of the misalignment, said products being aligned by the products resting against a product support and the product support being actuated in order to perform the alignment movement, and wherein the alignment of the products is accomplished without relative movements between the products and the product support. The invention further relates to a device for the alignment of food products.

23 Claims, 2 Drawing Sheets

ALIGNMENT OF FOOD PRODUCTS

CROSS-REFERENCES TO RELATED APPLICATIONS

Figure 1:
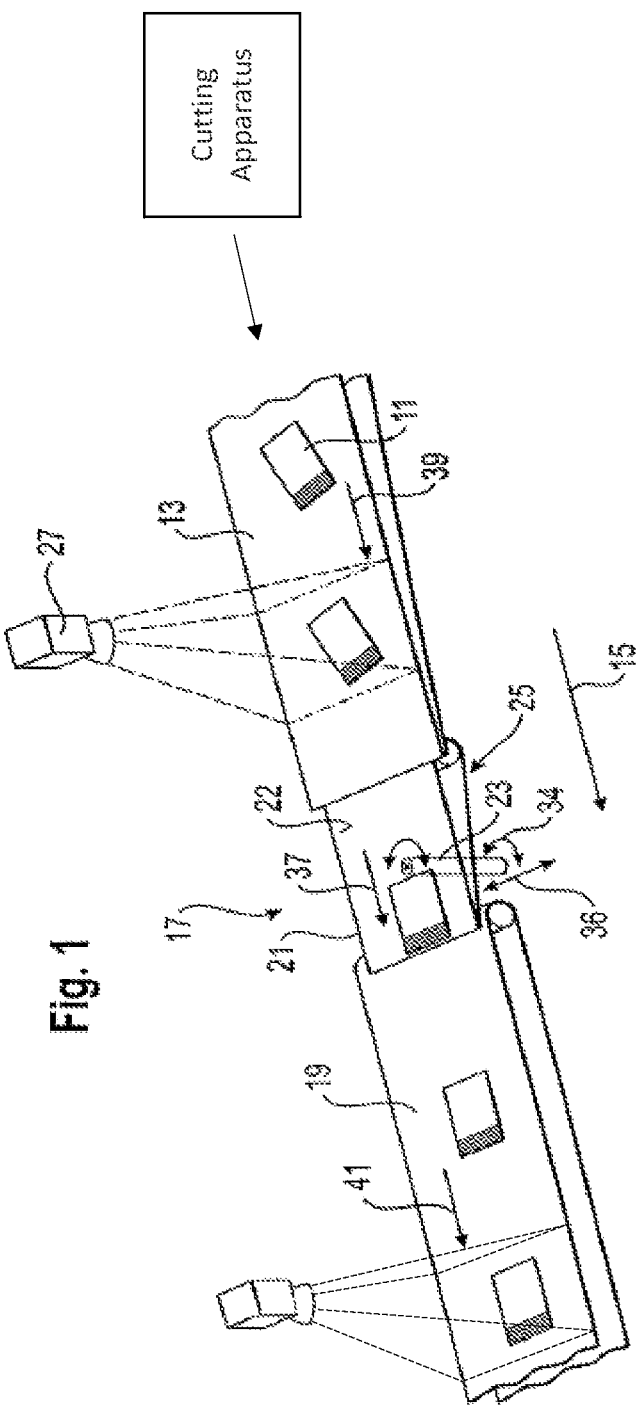

This application is a National Stage of International Application No. PCT/EP2008/004255 filed May 28, 2008, and which claims the benefit of German Patent Application No. 10 2007 036 020.9, filed Aug. 1, 2007, the disclosures of which are incorporated herein by reference.

The invention relates to a method and to an apparatus for the alignment of food products.

The problem generally exists in the handling of food products that, when the products are supplied to a system which should carry out a specific work procedure, the products are not aligned—i.e. positioned and orientated—such that this system works without error. The products can, for example, be rotated and/or laterally displaced. It is therefore necessary to take measures to align the products according to the demands of the respective system.

An example in which this problem is generally encountered is a processing line which includes a high-speed slicer as a system disposed upstream and a packaging machine as a system disposed downstream. Food products are cut up at high speed with the slicer, with portions being formed which each comprise a plurality of product slices and can be present, for example, in the form of a stack or of overlapping slices. These portions are supplied to a packaging machine using conveying devices arranged downstream of the slicer. The conveying path between the slicer and the packaging machine can have an extremely complex structure and can, for example, include different devices for weighing, sorting, insertion and grouping, with it also being required in practice that product streams coming from a plurality of slicers are combined to compile portions of different food products and subsequently to package these compilations. Due to the large variety of influences on the portions on their production and on their transport, it cannot always be ensured that the portions have the respective required alignment when they reach the packaging machine or another device at which a precise positioning and orientation of the portions is important.

Measures for the alignment of products and also of portions of product slices produced by means of a slicer are generally known. Portions which have a sufficient stability of their own, e.g. stacks of slices of cheese, can be aligned, for example, in that they are conveyed toward an abutment or between two vertically arranged bands, whereby the portions are correctly aligned. With less stable portions, such a manner of alignment is, however, not possible. It is also known to integrate an alignment path in the conveying path for the products which has a divided conveying belt, with the products lying simultaneously on two part belts extending in parallel and drivable separately from one another. Since the two part belts are driven at a relative speed different from zero, a rotation of the products can be achieved. In this measure, a relative movement necessarily occurs between the products and the product support formed by the part belts since the part belts on which the product lies move at different speeds beneath the product. The slip between the product and the product support which hereby necessarily occurs is problematic for specific product sorts and this alignment principle can therefore not be applied in a number of cases. There is the additional fact that the effect of the slip cannot be predicted accurately due to the different quality and/or consistency of the products. A direct alignment of the products, for example a rotation of the products by a predetermined angle can therefore not be realized with the desired precision in many cases.

A readjustment is therefore frequently necessary with such systems which bring about a higher effort and thus higher costs.

It is the object of the invention to provide a possibility for the alignment of food products which is simple, which works reliably and which is in particular as independent as possible from the product quality and/or consistency, with additionally in particular the forces acting on the products in the alignment being kept as small as possible.

This object is satisfied by the features of the independent method claim and of the independent apparatus claim.

In the method in accordance with the invention, food products running in on an incoming conveyer in a conveying direction arrive at an alignment station at which the products are aligned and from which the aligned products move to an outgoing conveyor, with a misalignment of the products with respect to a desired alignment being detected and the alignment of the products taking place in dependence on the misalignment. The alignment of the products takes place in that the products lie on a product support of the alignment station and the product support is controlled for the carrying out of alignment movements, with the alignment of the products being done without a relative movement between the products and the product support.

With the apparatus in accordance with the invention, at least one incoming conveyor, at least one outgoing conveyor, at least one alignment station arranged between the incoming conveyor and the outgoing conveyor and at least one detection means are provided, with a misalignment of the products with respect to a desired alignment being able to be detected by said detection means and with the alignment station having a product support for the products which can be controlled for the carrying out of alignment movements in dependence on the misalignment to align the products in accordance with the desired alignment. The product support is formed such that the product support can be moved on the carrying out of the alignment movements while maintaining the relative position between the product support and the products.

A relative movement between the product and the product support on the alignment of the products is avoided by the invention. The product alignment in accordance with the invention is hereby independent of the product consistency and quality. In addition, a high precision in the alignment can be achieved with a relatively low effort. The wanted desired direction of the products can thus be achieved reliably on the basis of a detected misalignment and of the control of the product support derived therefrom. A readjustment can be dispensed with at least in most cases. A further advantage of the invention is that interfering accelerations of the products during the alignment are avoided. It is in particular not necessary to stop the product intermittently and to accelerate it again. A particularly gentle handling of the products on their alignment can consequently be realized with the invention.

In a possible embodiment of the invention, the product support can be moved as a whole to carry out the alignment movements required for the manufacture of the desired alignment. It is possible in this respect that the product support is formed so that it can be both rotated and laterally displaced. The orientation and positioning of the products can hereby be corrected. An alignment movement of the product support can thus be composed of a rotation and a translation. The product can hereby be given any desired orientation and position with respect to the outgoing conveyor connected downstream and thus with respect to the further downstream devices.

The alignment station in particular includes an endless belt conveyor whose upper run forms the product support. The endless belt conveyor can in particular be moved as a whole for the carrying out of the alignment movements, and indeed in addition to its actual transport function which is given by the circulating endless belt. In this respect, the products can consequently be aligned by corresponding movement of this correction belt, while it is conveyed onward within the total process. A stopping of the product taking place for the purpose of the alignment and thus unnecessary product accelerations are hereby avoided. disruptive performance reductions of the total system also do not occur through the alignment of the products due to product stops being dispensed with.

Further embodiments of the invention are also set forth in the dependent claims, in the description and in the drawing.

Figure 2:
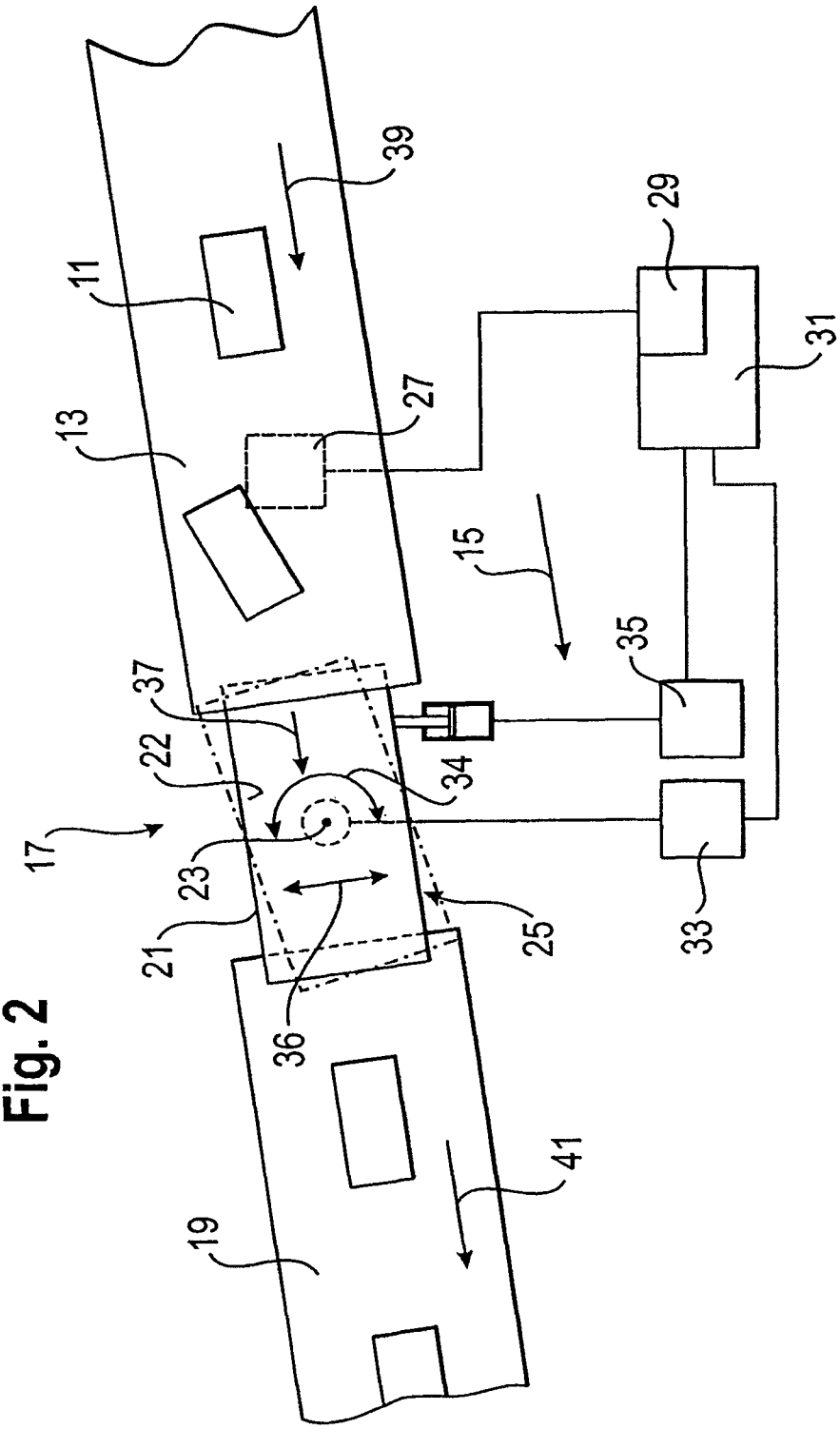

The invention will be described in the following by way of example with reference to the drawing. There are shown:

FIG. 1 an embodiment of an alignment apparatus in accordance with the invention; and FIG. 2 a further representation of the alignment apparatus of FIG. 1.

A part of the total system for the processing of food products is shown in FIGS. 1 and 2. The apparatus shown includes an incoming conveyor 13 formed as an endless belt conveyor and an outgoing conveyor 19 which likewise includes an endless conveyor belt. The conveying direction of the apparatus generally indicated by an arrow 15 is determined by the conveying directions 39, 41 of the endless belts 13, 19 which coincide in this embodiment. This is, however, not compulsory. The conveying directions 39, 41 of the endless belt conveyors 13, 19 can generally also include an angle different from zero with one another.

The end of the incoming conveyor 13 at the outgoing side and the end of the outgoing conveyor 19 at the incoming side are arranged spaced apart from one another in the conveying direction 15. This gap is bridged by a further endless belt conveyor 25 which here—like the incoming conveyor 13, too—is provided in the form of a so-called knife-edge belt which has a wedge shape—tapering in the transport direction 37 of the conveyor 25. The conveying belt 21 is arranged with an overlap for the incoming conveyor 13 and the outgoing conveyor 19 at the incoming side and at the outgoing side respectively. A low-interference transition between the individual conveyors is ensured by this arrangement.

The interposed conveyor 25 serves as a correction belt and is a component of an alignment station 17 which serves to align products 11 running in on the incoming conveyor 13 so that they have a respectively desired orientation and position with respect to the outgoing conveyor 19 or its conveying device 41 on the transfer to the downstream outgoing conveyor 19 in order to be able to be transferred to a system, not shown, downstream of the outgoing conveyor 19, for example a packaging machine, in a correct orientation and positioning.

The products 11 are, for example, portions from a plurality of food slices which are produced by a high-speed slicer, not shown, disposed upstream of the incoming conveyor 13. The alignment station 17 in accordance with the invention is, however, generally able to align any desired food products in the respective desired manner, i.e. to give the products the orientation and position required for a downstream system.

The alignment station 17 in the embodiment explained here additionally includes two drives 33, 35 (FIG. 2) which serve to move the endless belt conveyor 25 for the carrying out of alignment movements 34, 36 as a whole relative to the incoming conveyor 13 and to the outgoing conveyor 19. The one drive 33 provides a rotation 34 of the conveyor 25 about an axis 23. The axis 23 extends perpendicular to the contact surface 22 which is formed by the upper run of the endless belt, that is by the product support 21 of the conveyor 25.

The other drive 35 serves to displace the endless belt 25 as a whole, with this displacement 36 extending perpendicular to the conveying direction 15, that is perpendicular to the conveying directions 39, 41 of the incoming conveyor 13 and of the outgoing conveyor 19.

The rotary drive 33 and the linear drive 35 are connected to a central control and/or regulation device 31 which is shown schematically in FIG. 2. The device 31 includes an image processing device 29 which is connected to a camera system 27. The camera system 27 is arranged above the incoming conveyor 13. The field of view of the camera 27 is indicated by dashed lines in FIG. 1. The camera system 27 or the image processing device 29 is equipped with a suitable image processing software with which the system is able to detect the orientation and the position of every single product 11 running beneath the camera 11 relative to a reference. A side edge of the endless belt 13 or a suitable marking on the endless belt 13 can serve as the reference, for example. The image data delivered by the camera 27 for every single product 11 can be examined by means of the image processing device 29 as to whether a misalignment of the respective product 11 with respect to a desired direction is present or not. The actual position and orientation of the products 11 relative to the desired alignment, that is to the desired position and the desired orientation, can consequently be determined practically in real time in this manner.

The desired orientation is e.g. an alignment of the longitudinal axis of at least substantially rectangular products 11 parallel to the conveying direction 39 of the incoming conveyor 13, whereas e.g. an arrangement of the products 11 at the center—observed transversely to the conveying direction 39—of the incoming conveyor 13 is preset as the desired position. The desired alignment can also be fixed with respect to the outgoing conveyor 19 since the relative arrangement of the outgoing conveyor 19 and of the incoming conveyor 13 is known. In most cases or at least in many practical cases, provision is anyway made that the incoming conveyor 13 and the outgoing conveyor 19—corresponding to the example of FIGS. 1 and 2—are arranged with coinciding central longitudinal axes.

The drives 33, 35 of the product support 21 are controlled by the device 31 on the basis of the result delivered by the image processing device 29 such that the resulting alignment movements 34, 36 of the product support 21 correct the misalignment of the respective product 11. A rotation 34 of the correction belt 25 changes the orientation and a displacement 36 changes the position of the products 11 with respect to the outgoing conveyor 19.

Since all the relevant parameters are known at the time of detection of a product 11 by the camera system 27, that is in particular the belt speed of the incoming conveyor 13, the distance—viewed in the conveying direction 15—of the product 11 from the alignment station 17, the position of the product 11 on the incoming conveyor 13 in the transverse direction, the adjustment paths of the correction belt 25 achievable by means of the drives 33, 35 and the belt speed of the correction belt 25, the time delay with which the product 11 moves onto the product support 21 of the alignment station 17 after its detection by the camera 27 is also known to the control and/or regulation device. Consequently, the pre-conditions are given that the device 31 can always initiate the respective required alignment movements 34, 36 for each product 11 at the right time.

Since any slip between the products 11 and the support surface 22 of the product support 21 is avoided in accordance with the invention on the alignment of the products 11 by means of the product support 21 movable as a whole, incalculable deviations from the alignment of the products 11 predictable on the basis of the known parameters are practically precluded after the conclusion of the alignment procedure. A readjustment of any kind is therefore generally not necessary.

It is nevertheless possible within the framework of the invention in deviation from the embodiment shown in FIGS. 1 and 2 to provide a further camera system above the alignment station 17 with which the result of a first alignment procedure can be checked which was carried out on the basis of the data of the first camera system 27 arranged above the incoming conveyor 13. If a misalignment of a product already located on the product support 21 is still present, a further alignment procedure can be carried out by a repeated control of the drives 33, 35 as long as the product 11 conveyed by means of the endless belt 25 during the alignment is still on the product support 21. The precision of the product alignment can be further improved by such a "fine alignment".

In a further alternative embodiment of the invention, the camera system 27 provided for the detection of a misalignment of the products 11 can be arranged only above the alignment station 17 so that the detection of a misalignment of the products 11 does not take place with products 11 still on the incoming conveyor 13, but with products already located on the product support 21. The time available for a correction of this misalignment is necessarily shortened in this respect with regard to an earlier misalignment detection. In dependence on the conveying length of the endless belt conveyor 25 present in the conveying direction 15, this variant can nevertheless represent an interesting solution within the framework of applications in which a power reduction hereby either actually does not occur or can be easily tolerated.

REFERENCE NUMERAL LIST

11 food product, portion of food slices
13 incoming conveyor
15 conveying direction
17 alignment station
19 outgoing conveyor
21 product support
22 support surface
23 axis of rotation
25 endless belt conveyor
27 image taking device, camera system
29 image processing device
31 control and/or regulation device
33 rotary drive
34 rotary movement
35 linear drive
36 displacement
37 transport movement
39 conveying direction of the incoming conveyor
41 conveying direction of the outgoing conveyor

The invention claimed is:

1. A method for the angular alignment of food products, wherein food products running in on an incoming conveyor in a conveying direction arrive at an angular alignment station at which the products are aligned and from which the aligned products move to an outgoing conveyor;
   wherein an angular misalignment of the products with respect to a desired angular alignment is detected and the angular alignment of the products takes place in dependence on the angular misalignment;
wherein the angular alignment of the products takes place in that the products lie on a product support of the alignment station and the product support is controlled for the carrying out of angular alignment movements; and
   wherein the angular alignment of the products is done without relative movements between the products and the product support; and
   wherein the product support is rotated for the angular alignment of the products.

2. A method in accordance with claim 1, characterized in that the alignment movements of the product support are superimposed on an additional transport movement of the product support which serves to convey the products in the direction of the outgoing conveyor by means of the alignment station, with the alignment movements in particular being independent of the additional transport movement.

3. A method in accordance with claim 1, characterized in that the product support is controlled such that the alignment movements are in each case made up of a plurality of individual movements, in particular of a rotary movement and of a translation movement, wherein the individual movements take place sequentially in time, superimposed on one another or partly overlapping one another.

4. A method in accordance with claim 1, characterized in that the product support is moved as a whole for the carrying out of the alignment movements.

5. A method in accordance with claim 1, characterized in that the product support is rotated about an axis of rotation extending substantially perpendicular to a support surface of the product support and is displaced in a plane extending substantially parallel to a support surface of the product support, for the alignment of the products.

6. A method in accordance with claim 1, characterized in that the products are transferred from the incoming conveyor directly to the alignment station or from the alignment station directly to the outgoing conveyor.

7. A method in accordance with claim 1, characterized in that the products are transported simultaneously in the direction of the outgoing conveyor while they are being aligned.

8. A method in accordance with claim 1, characterized in that a product transport taking place simultaneously with the alignment of the products is likewise carried out by means of the alignment station.

9. A method in accordance with claim 1, characterized in that a product transport taking place simultaneously with the alignment of the products is carried out by means of an endless belt conveyor on whose upper run the products lie while they are being aligned and which is additionally controlled for the carrying out of the alignment movements.

10. A method in accordance with claim 1, characterized in that the alignment of the products with respect to the desired alignment is determined by means of at least one image taking device; in that the image data taken are supplied to an image processing device; and in that, on a detected misalignment of the product, the alignment station is controlled by means of a control or regulation device which communicates with the image processing device for the carrying out of alignment movements such that the misalignment is eliminated and the products are orientated in accordance with the desired direction.

11. A method in accordance with claim 1, characterized in that the alignment of the products with respect to the desired alignment is determined a plurality of times sequentially in time in each case by means of at least one image taking device, with a further alignment procedure being carried out when, subsequent to a first alignment procedure in which a first image taking device is involved, a misalignment of the products is still detected by means of a further image taking device.

12. A method in accordance with claim 1, characterized in that the alignment of the products with respect to the desired alignment is only determined or is determined for the first time as long as the products are still located on the incoming conveyor or are already located on the product support of the alignment station.

13. A method in accordance with claim 1, characterized in that the conveying direction of the incoming conveyor is used as the reference for the detection of a misalignment of the products, with in particular the conveying direction of the outgoing conveyor extending parallel to the conveying direction of the incoming conveyor.

14. A method in accordance with claim 1, characterized in that the products are portions which are each formed by a plurality of food slices which are obtained by cutting up food products by means of a cutting apparatus, in particular by means of a high-speed slicer, arranged upstream of the incoming conveyor, viewed in the conveying direction.

15. An apparatus for the angular alignment of food products,
having at least one incoming conveyor, at least one outgoing conveyor, at least one angular alignment station arranged between the incoming conveyor and the outgoing conveyor, and at least one detection means for detecting an angular misalignment of the products with respect to a desired angular alignment;
 wherein the angular alignment station has a product support for the products which is controllable for the carrying out of angular alignment movements in dependence on the angular misalignment to align the products in accordance with the desired angular alignment; and
 wherein the product support is formed such that, on the carrying out of the angular alignment movements, the product support is movable while maintaining the relative position between the product support and the products; and
 wherein the alignment station includes an endless belt conveyor, the endless belt conveyor being arranged overlapping with the incoming conveyor and/or the outgoing conveyor.

16. An apparatus in accordance with claim 15, characterized in that the alignment station is simultaneously a conveying device with which the products can be moved in the direction of the outgoing conveyor.

17. An apparatus in accordance with claim 15, characterized in that the alignment station is arranged between the incoming conveyor and the outgoing conveyor such that the products can be transferred from the incoming conveyor directly to the alignment station and/or from the alignment station directly to the outgoing conveyor.

18. An apparatus in accordance with claim 15, characterized in that the alignment station is formed as a knife-edge belt.

19. An apparatus in accordance with claim 15, characterized in that the incoming conveyor or the outgoing conveyor include an endless belt conveyor.

20. An apparatus in accordance with claim 15, characterized in that the alignment movements of the product support are independent of an additional transport movement of the product surface which serves to convey the products in the direction of the outgoing conveyor by means of the alignment station.

21. An apparatus in accordance with claim 15, characterized in that the product support is movable as a whole for the carrying out of the alignment movements.

22. An apparatus in accordance with claim 15, characterized in that the product support has a support surface for the products which is controllable to make a rotation about an axis of rotation extending substantially perpendicular to the support surface and to make a displacement in a plane extending substantially parallel to the support surface, in particular transverse to a conveying direction of the incoming conveyor or to a separate conveying direction.

23. An apparatus in accordance with claim 15, characterized in that at least one image taking device serving as a detection means, in particular a camera system, with which the misalignment can be detected, an image processing device to which the image data taken can be supplied and a control or regulation unit communicating with the image processing device are provided, with the alignment station being controllable by said control or regulating device for the carrying out of the alignment movements on a detected misalignment.

* * * * *